United States Patent
Gupta et al.

(10) Patent No.: US 11,704,042 B2
(45) Date of Patent: Jul. 18, 2023

(54) DYNAMICALLY ADAPTIVE TECHNIQUE FOR REFERENCE SNAPSHOT SELECTION

(71) Applicant: Nutanix, Inc., San Jose, CA (US)

(72) Inventors: Abhishek Gupta, Ghaziabad (IN); Brajesh Kumar Shrivastava, Bengaluru (IN); Pranab Patnaik, Cary, NC (US)

(73) Assignee: Nutanix, Inc., San Jose, CA (US)

( * ) Notice: Subject to any disclaimer, the term of this patent is extended or adjusted under 35 U.S.C. 154(b) by 70 days.

(21) Appl. No.: 17/512,217

(22) Filed: Oct. 27, 2021

(65) Prior Publication Data
US 2023/0080691 A1     Mar. 16, 2023

(30) Foreign Application Priority Data
Sep. 15, 2021   (IN) ............................. 202141041613

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 8,364,639 B1* | 1/2013 | Koryakina | G06F 9/45533 718/1 |
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 10,853,182 B1* | 12/2020 | Vig | G06F 16/23 |

(Continued)

OTHER PUBLICATIONS

Cano, Ignacio, "Curator: Self-Managing Storage for Enterprise Clusters" University of Washington; published Mar. 2017; pp. all.

(Continued)

*Primary Examiner* — Daniel D Tsui
(74) *Attorney, Agent, or Firm* — Cesari and McKenna, LLP

(57) ABSTRACT

A reference snapshot selection technique is configured to select a reference snapshot resolution algorithm used to determine an appropriate reference snapshot that may be employed to perform incremental snapshot replication of workload data between primary and secondary sites in a data replication environment. A reference resolution procedure is configured to process a set of constraints from the data replication environment to dynamically select the reference snapshot resolution algorithm based on a figure of merit that satisfies administrative constraints to reduce or optimize resource utilization in the data replication environment.

24 Claims, 5 Drawing Sheets

(56) References Cited

U.S. PATENT DOCUMENTS

2012/0110142 A1* 5/2012 Montagna ................. G06F 8/71
709/220

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp.

* cited by examiner

DYNAMICALLY ADAPTIVE TECHNIQUE FOR REFERENCE SNAPSHOT SELECTION

CROSS-REFERENCE TO RELATED APPLICATIONS

The present application claims the benefit of India Provisional Patent Application Serial No. 202141041613, which was filed on Sep. 15, 2021, by Abhishek Gupta, et al. for DYNAMICALLY ADAPTIVE TECHNIQUE FOR REFERENCE SNAPSHOT SELECTION, which is hereby incorporated by reference.

BACKGROUND

Technical Field

The present disclosure relates to data replication and, more specifically, to efficient replication of data in a data replication environment.

Background Information

Data failover generally involves copying or replicating data among one or more nodes of clusters embodied as, e.g., datacenters to enable continued operation of data processing operations in a data replication environment, such as backup and/or disaster recovery (DR). Such data replication may involve point-in-time images or "snapshots" of workloads characterized by a set of virtual disks (vdisks) and virtual machine (VM) configurations. The vdisk and VM configurations (i.e., data) may consist of logical constructs, such as files, that are periodically replicated from a source datacenter to storage facilities and/or one or more target datacenters (sites). The data of these files may have incremental changes over a period of time. To track and synchronize such data changes among the sites, a full (reference) snapshot of the data may be generated at the source site and replicated to the target site. Thereafter, one or more subsequent snapshots may be generated and compared with the reference snapshot to identify incremental changes to the data since the reference snapshot. The amount of data representing these incremental changes that is needed for replication in backup and DR environments depends on the reference snapshot selected for the files to transfer the data.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique for selecting a reference snapshot resolution algorithm used to determine an appropriate reference snapshot that may be employed to perform incremental snapshot replication of workload data between primary and secondary sites in a data replication environment. To that end, a reference resolution procedure is configured to process a set of constraints from the data replication environment to dynamically select the reference snapshot resolution algorithm from a group of such algorithms based on a "figure of merit" according to each of the algorithms (e.g., path-distance, time-distance, resource consumption to compute incremental changes or deltas, metadata differences in deltas). In addition, the algorithm may consider figures of merit relating to conditions specific to the data replication environment (e.g., transmission latency between sites, amount of data to transfer, etc.) while adhering to administrative constraints such as recovery point objective. Illustratively, the figure of merit is used as a "closeness" measure according to each algorithm to determine (resolve) the reference snapshot. As such, the technique selects an appropriate figure of merit and, hence, an associated snapshot resolution algorithm that satisfies the administrative constraints to reduce or optimize resource utilization in the data replication environment.

Advantageously, the reference snapshot selection technique is dynamic (i.e., adaptive) to changes in conditions within the data replication environment. For example, as the primary and secondary sites become unavailable and impact redundancy, new sites may be added leading to network latency changes, network congestion changes between the sites, changes in an amount of data to replicate, and/or changes to a load on a site. In response, the technique may select a different reference snapshot resolution algorithm according to the changed conditions (i.e., a different figure of merit for reference snapshot selection may be more appropriate).

DESCRIPTION

Figure 1:
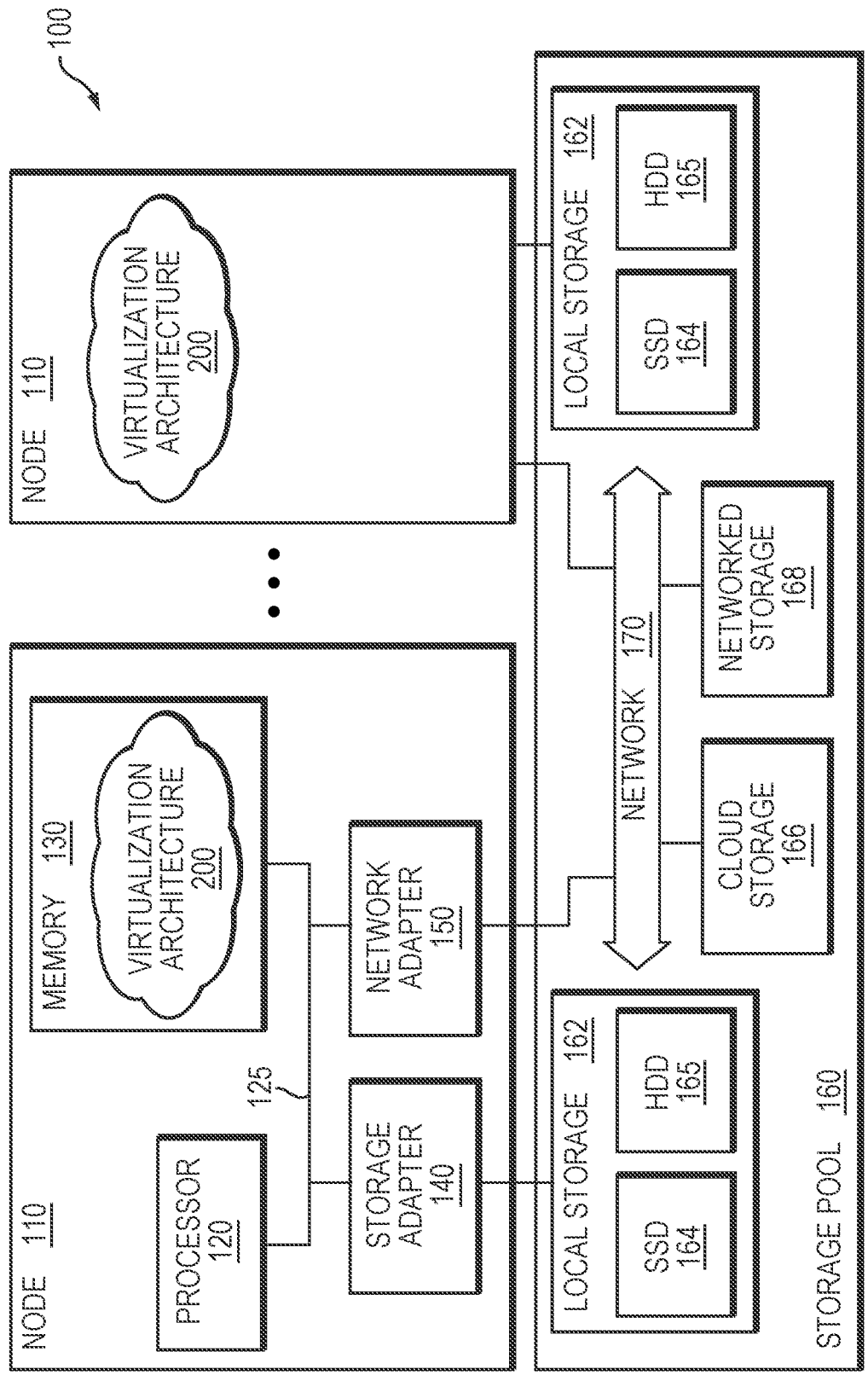
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
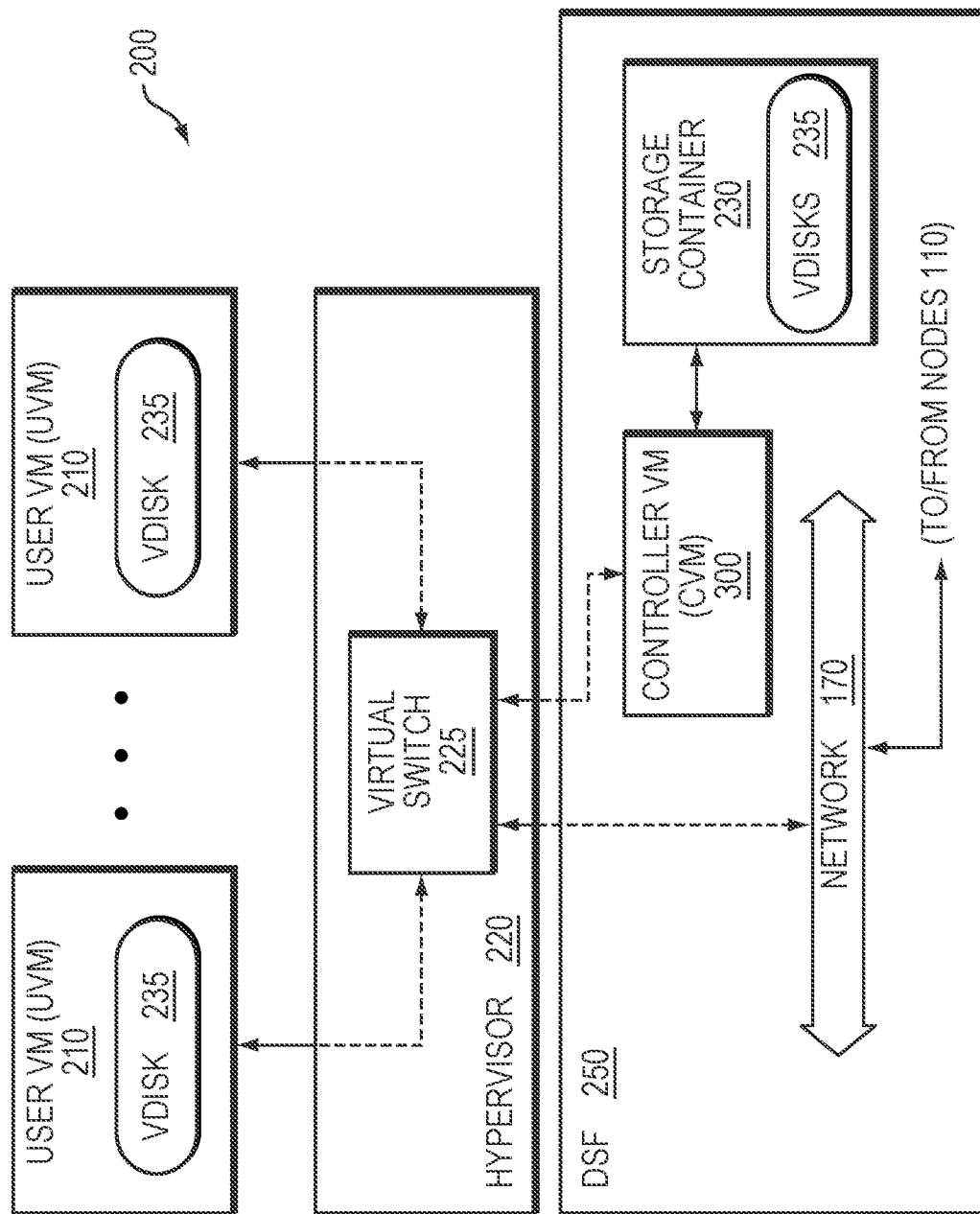
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KV M, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI. CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI. CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator. SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 30). This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response-begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
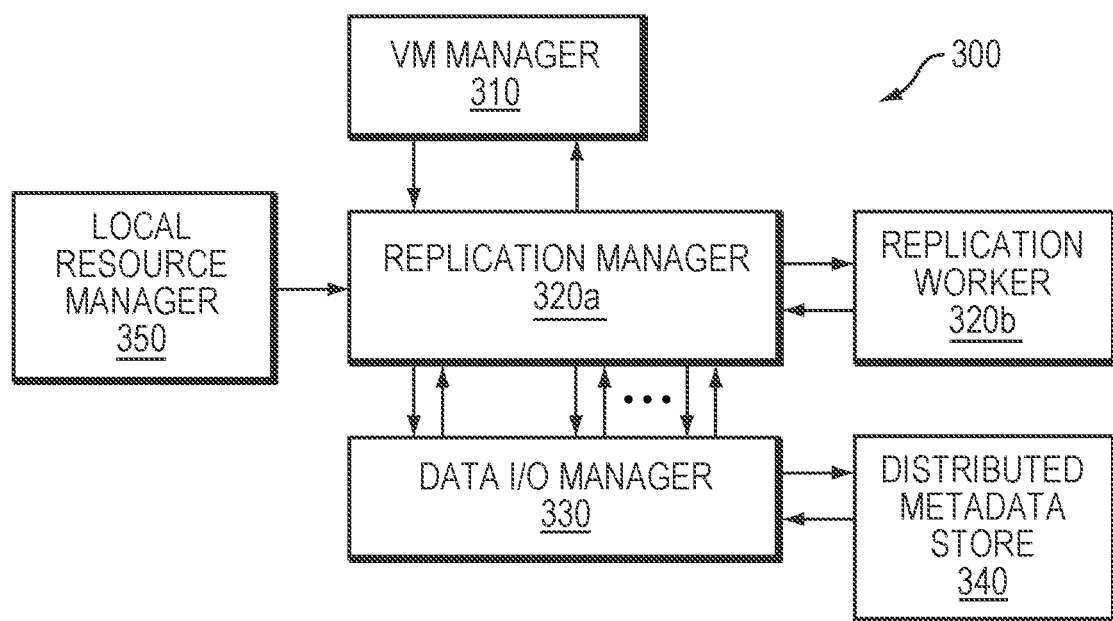
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 30) runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources of the cluster. A replication manager 320a is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320a may also interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data failover generally involves copying or replicating data among one or more nodes 110 of clusters 100 embodied as, e.g., datacenters to enable continued operation of data processing operations in a data replication environment, such as backup and/or disaster recovery (DR). The data replication environment includes two or more datacenters, i.e., sites, which are typically geographically separated by relatively large distances and connected over a communication network, such as a WAN. For example, data at a local datacenter (e.g., primary site) may be replicated over the network to one or more remote datacenters (e.g., secondary site) located at geographically separated distances to ensure continuity of data processing operations in the event of a failure of the nodes at the primary site.

Synchronous replication may be used to replicate the data between the sites such that each update to the data at the primary site is copied to the secondary site. For instance, every update (e.g., write operation) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a data replication environment or to facilitate recovery from, e.g., network outages in such an environment, a snapshot may be employed to establish a point-in-time reference from which the site can (re)synchronize the failover data.

In the absence of continuous synchronous replication between the sites, the current state of the failover data at the secondary site always "lags behind" (is not synchronized with) that of the primary site, resulting in possible data loss in the event of a failure of the primary site. If a specified amount of time lag in synchronization is tolerable, then asynchronous (incremental) replication may be selected between the sites. Incremental replication generally involves at least two point-in-time images or snapshots of the failover data to be replicated, e.g., a base snapshot that is used as a reference and a current snapshot that is used to identify incremental changes to the data since the base snapshot. To facilitate efficient incremental replication in a data protection environment, a base (reference) snapshot is required at each site. Note that the failover data may include an entire state of a vdisk or virtual machine including associated storage objects.

Figure 4:
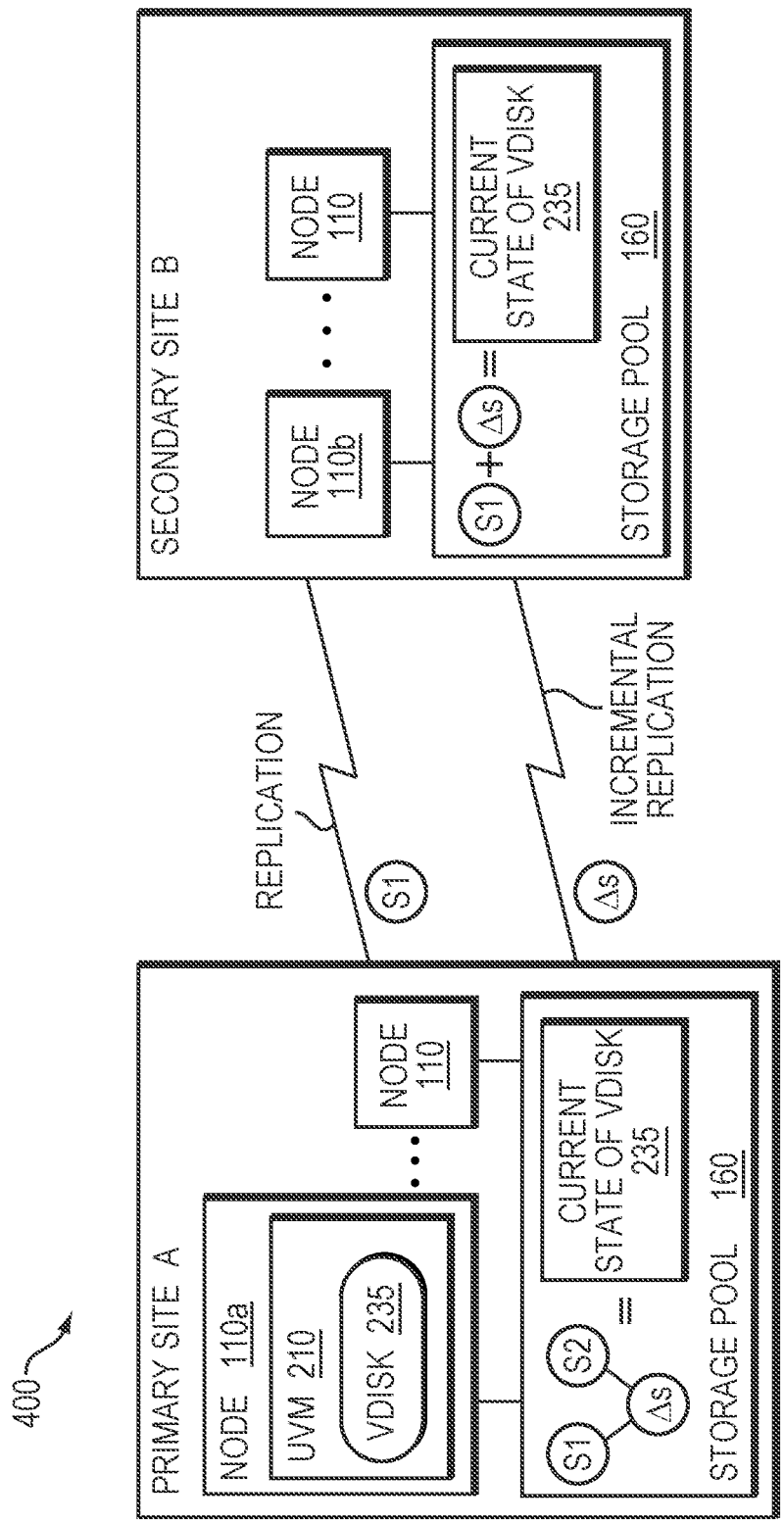
FIG. 4 is a block diagram of an exemplary data replication environment configured for use in various deployments such as disaster recovery.

FIG. 4 is a block diagram of an exemplary data replication environment configured for use in various deployments, such as backup and/or disaster recovery (DR). Illustratively, the environment 400 includes a primary site A and a secondary site B, wherein each site represents a datacenter embodied as a cluster 100 having one or more nodes 110. A category of data (e.g., workloads characterized by a vdisk 235) on primary node 110a at primary site A is designated for failover to secondary site B (e.g., secondary node 110b) in the event of failure of primary site A. The vdisk (i.e., data) may consist of logical constructs, such as files, that may have incremental changes over a period of time. Accordingly, a first snapshot S1 of the failover data is generated at the primary site A and replicated (e.g., via a form of asynchronous snapshot replication) to secondary site B as a base or reference snapshot S1. A period of time later, a second snapshot S2 may be generated at primary site A to reflect a current state of the failover data (e.g., vdisk 235). Since the reference snapshot S1 exists at sites A and B, only incremental changes (deltas Δs) to the data designated for failover need be sent (e.g., via incremental replication) to site B, which applies the deltas (Δs) to S1 so as to synchronize the state of the vdisk 235 to the time of the snapshot S2 at the primary site. The amount of data representing these incremental changes that is needed for replication in the DR environment deployment depends on the reference snapshot selected for the files to transfer the data.

The embodiments described herein are directed to a technique for selecting a reference snapshot resolution (i.e., determination) algorithm used to determine an appropriate reference snapshot that may be employed to perform incremental snapshot replication of workload data between primary and secondary sites in a data replication environment, e.g., to support disaster recovery. To that end, a reference resolution procedure is configured to process a set of constraints from the data replication environment to dynamically select the reference snapshot resolution algorithm from a group of such algorithms based on a "figure of merit" according to each of the algorithms, e.g., figures of merit such as path-distance, time-distance, resource consumption to compute deltas, metadata differences in deltas, "data-distance" (an amount of changed data between source and reference vdisks) and the like. In addition, the algorithm may consider figures of merit relating to conditions specific to the data replication environment (e.g., transmission latency between sites, amount of data to transfer, etc.) while adhering to administrative constraints such as recovery point objective (RPO) and reducing resource utilization in the data replication environment. Illustratively, the figure of merit is used as a "closeness" measure according to each algorithm to determine (resolve) the reference snapshot. As such, the technique selects an appropriate figure of merit and, hence, an associated snapshot resolution algorithm that satisfies the administrative constraints to reduce resource utilization in the data replication environment.

Assume the primary site and secondary sites include a large number of workload (e.g., vdisk) snapshots, some of which may be common among the sites as a result of previous replication. A snapshot of a vdisk 235 is generated at the primary (source) site A and it is desirable to replicate the (source) vdisk snapshot to the secondary site B for backup and/or DR purposes. In order to track and synchronize changes to the source vdisk among the sites, a reference snapshot is needed at the primary and secondary sites. To avoid replicating the source snapshot over the network to the secondary site, a common snapshot that is "close," e.g., based on a figure of merit, to the source snapshot may be used as a reference snapshot for incremental snapshot replication. Note that the term "close" as measured by the figure of merit is determined from, e.g., resource consumption factors resulting in fewer changes (deltas) between the source and reference snapshots and that different figures of merit may yield different reference snapshots being "closest." As such, determining a basis for measuring closeness (i.e., the figure of merit) of snapshots is an a priori step in resolving a reference snapshot.

Illustratively, figures of merit for calculating snapshot "closeness" are associated with specific reference snapshot resolution algorithms and differ across those algorithms. In addition, different reference snapshot resolution algorithms may determine different reference snapshots as conditions vary within the data replication environment according to administrative constraints, such as RPO. That is, a first snapshot resolution algorithm may yield a better fit to administrative constraints for a current (first environmental) condition in the data replication environment than a second snapshot resolution algorithm. As such, a "best fit" algorithm (e.g., a second reference snapshot resolution algorithm) may change as the conditions (e.g., second environmental conditions) in the data replication environment vary (e.g., sites become unavailable impacting redundancy, new sites are added leading to network latency changes, network congestion changes between sites, an amount of data to replicate changes, and/or a load on a site changes). The technique herein determines which of a group of reference snapshot resolutions algorithms is most appropriate based on the current conditions of data replication according to administrative constraints.

According to the technique, a number of different reference resolution algorithms may be employed to determine the closeness of the common snapshots to the source snapshot. In one or more embodiments, the closeness determination may be based on algorithmic calculation of a different figure of merit, such as (i) time-distance calculated from an algorithm that computes a time of creation of the common snapshots (files) and a duration for which data is absorbed in the files, and determines (chooses) the common snapshot that is closest to the source snapshot (in terms of time); (ii) path-distance calculated from an algorithm that computes a path distance of the common snapshots, e.g., within a hierarchical structure of a filesystem, to the source snapshot and determines the common snapshot that is closest to the source snapshot (in terms of distance); and/or (iii) metadata difference calculated from an algorithm that computes the differences (diffs or deltas) between the common snapshots and the source snapshot, and determines the "best" common snapshot that results in the least amount of data transfer to the secondary site so as to reduce consumption of network bandwidth, as well as associated data storage (writes) and retrieval (reads) at the secondary site. Note, however, that determination of the best common (reference) snapshot may require consumption of extensive compute (CPU) and memory resources to perform the delta computations. In the event the primary (and/or secondary) site does not have the available compute and memory resources to perform such extensive computations, another (less optimal) reference resolution algorithm may involve selection of a common snapshot that is an immediate ancestor (e.g., parent file) of the source snapshot as a reference snapshot for use with the incremental snapshot replication.

Figure 5:
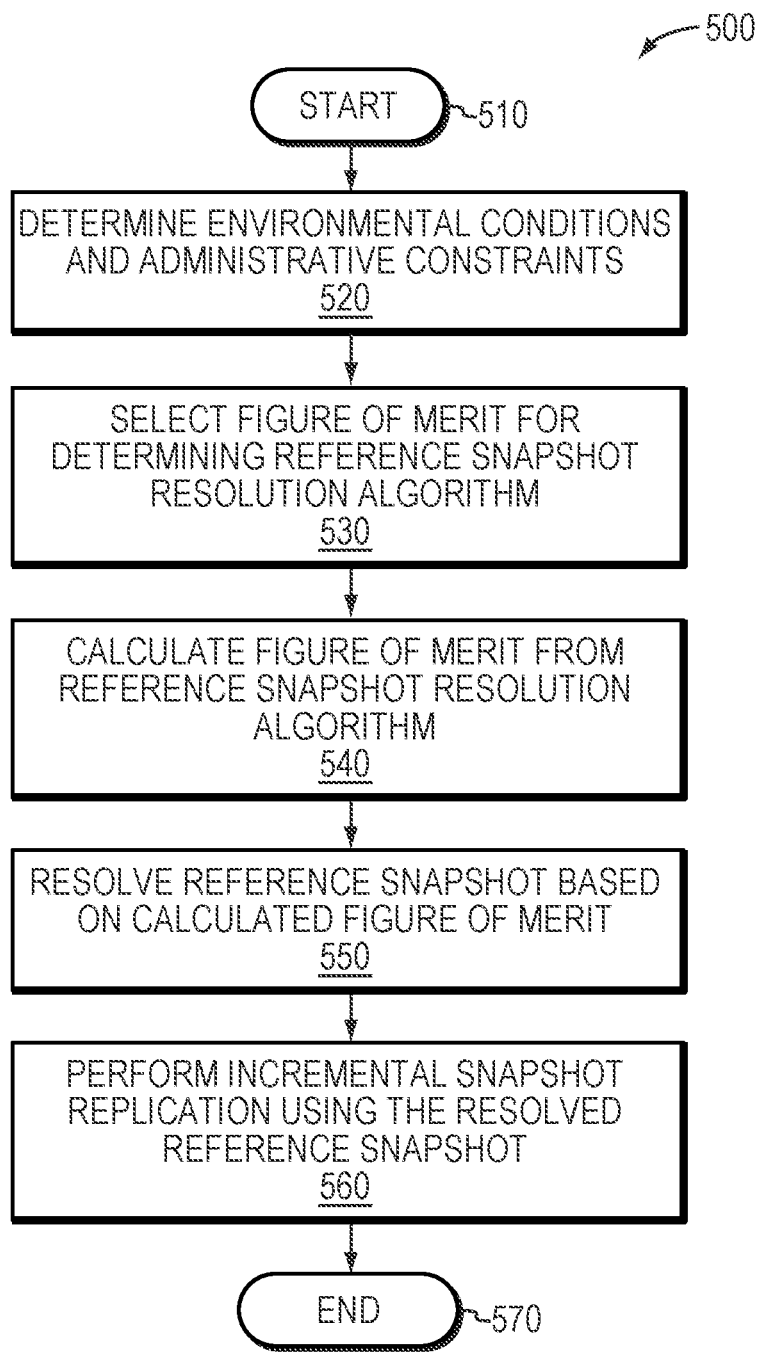
FIG. 5 is a simplified procedure for selecting an algorithm to determine an appropriate reference snapshot for the data replication environment.

FIG. 5 is a simplified procedure for selecting an algorithm to determine an appropriate reference snapshot for the data replication environment. In an embodiment, the simplified procedure is reference resolution procedure 500 that is illustratively embodied as an algorithmic process of the replication manager 320a. The procedure starts at step 510 and proceeds to step 520 to determine environmental conditions of the data replication environment as well as administrative constraints. In addition to the resource consumption factors or considerations (i.e., system constraints) noted above, other constraints that are considered by the reference resolution procedure when selecting the reference resolution algorithm include environmental constraints (e.g., a backup/DR environment, associated system load and location of secondary site for replication, as well as corresponding convergence times) and administrative constraints (e.g., recovery point objective, RPO). At step 530, these constraints and conditions are provided as inputs to the reference resolution procedure and processed to select a reference resolution algorithm (from among many algorithms) used to determine a reference snapshot a particular point in time. Illustratively, the reference resolution procedure may dynamically adapt to constraints at different points in time as conditions of the data replication environment change. As noted above, the reference resolution procedure may select a reference resolution algorithm (implementing a figure of merit calculation for determining a reference snapshot) that is different from the algorithm previously selected (in time) because the previous algorithm may determine a reference snapshot that does not fit with the administrative constraint (e.g., RPO), i.e., the algorithm may take too long to converge and may not meet the RPO threshold. Note also that selection of the reference resolution algorithm satisfies the administrative constraints so as to reduce resource utilization in the data replication environment.

At step 540, the reference snapshot resolution algorithm is used to calculate figures of merit which, at step 550, is used to resolve a reference snapshot. Moreover, the reference resolution procedure may dynamically select the different reference resolution algorithm because a system constraint (e.g., amount and type of storage available at the secondary site) fits with the secondary site's utilization of an array of SSD storage devices. At step 560, incremental snapshot replication is performed using the resolved reference snapshot from the prior step and, at step 570, the reference resolution procedure ends.

In an embodiment, the reference resolution procedure may be executed periodically or at specific times of day. In another embodiment the reference resolution procedure may be executed when a change of conditions of the data replication environment exceeds a predetermined threshold, e.g., a network latency between sites increases by 50%. In yet another embodiment, the reference resolution procedure may be executed when the deltas are updated between the sites.

In sum, the reference resolution procedure is configured to process various constraints associated with current environmental, system and administrative parameters to dynamically select a "best fit" reference resolution algorithm for determining an appropriate reference snapshot. Once selected, the reference snapshot is used to compute incremental changes or deltas to source snapshot data (vdisk) and those deltas are replicated from the primary site to the secondary site. If the delta replication does not complete, e.g., is interrupted due to network outage or site unavailability), replication may be restarted at a later time. As a result, the selected algorithm may be re-executed, which may result in determination of a different reference snapshot. Yet, there may be a cost associated with determination (and use) of a different reference snapshot to complete the interrupted replication because, e.g., there may be some data subject to re-replication.

Advantageously, the reference snapshot selection technique is dynamic (i.e., adaptive) to changes in conditions determined within the data replication environment. For example, as the primary and secondary sites become unavailable and impact redundancy, new sites may be added leading to network latency changes, network congestion changes between the sites, changes in an amount of data to replicate, and/or changes to a load on a site. In response, the technique may select a different reference snapshot resolution algorithm according to the changed conditions (i.e., a different figure of merit for reference snapshot selection may be more appropriate).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    determining one or more first environmental conditions and administrative constraints of a data replication environment having primary and secondary sites;
    selecting a first figure of merit for determining a first reference snapshot resolution algorithm according to the determined first environmental condition and administrative constraint to reduce resource utilization in the data replication environment;
    calculating the first figure of merit from the determined first reference snapshot resolution algorithm;
    resolving a first reference snapshot based on the calculated figure of merit; and
    performing incremental snapshot replication of data between the primary and secondary sites using the first reference snapshot.

2. The method of claim 1, further comprising:
    determining one or more second environmental conditions and administrative constraints of the data replication environment;
    selecting a second figure of merit for determining a second reference snapshot resolution algorithm according to the determined second environmental condition and administrative constraint;
    resolving second reference snapshot based on the determined second reference snapshot resolution algorithm; and
    performing incremental snapshot replication of data between the primary and secondary sites using the second reference snapshot.

3. The method of claim 1, wherein the first figure of merit is selected from a group consisting of time-distance, path-distance, and data-distance.

4. The method of claim 1, wherein the administrative constraint is a recovery point objective.

5. The method of claim 1, wherein the first snapshot resolution algorithm is determined based on a system constraint according to a type of storage device at one or more of the sites.

6. The method of claim 1, wherein the first environmental condition is determined periodically.

7. The method of claim 1, wherein the first environmental condition is determined in response to a change in the one or more of the first environment conditions exceeding a predetermined threshold.

8. The method of claim 1, wherein the first environmental condition is determined when incremental snapshot data is replicated among the sites.

9. A non-transitory computer readable medium including program instructions for execution on a processor, the program instructions configured to:

determine one or more first environmental conditions and administrative constraints of a data replication environment having primary and secondary sites;

select a first figure of merit for determining a first reference snapshot resolution algorithm according to the determined first environmental condition and administrative constraint to reduce resource utilization in the data replication environment;

calculate the first figure of merit from the determined first reference snapshot resolution algorithm;

resolve a first reference snapshot based on the calculated figure of merit; and perform incremental snapshot replication of data between the primary and secondary sites using the first reference snapshot.

10. The non-transitory computer readable medium of claim 9, wherein the program instructions for execution on a processor are further configured to:

determine one or more second environmental conditions and administrative constraints of the data replication environment;

select a second figure of merit for determining a second reference snapshot resolution algorithm according to the determined second environmental condition and administrative constraint;

resolve second reference snapshot based on the determined second reference snapshot resolution algorithm; and perform incremental snapshot replication of data between the primary and secondary sites using the second reference snapshot.

11. The non-transitory computer readable medium of claim 9, wherein the first figure of merit is selected from a group consisting of time-distance, data-distance, and path-distance.

12. The non-transitory computer readable medium of claim 9, wherein the administrative constraint is a recovery point objective.

13. The non-transitory computer readable medium of claim 9, wherein the first snapshot resolution algorithm is determined based on a system constraint according to a type of storage device at one or more of the sites.

14. The non-transitory computer readable medium of claim 9, wherein the first environmental condition is determined periodically.

15. The non-transitory computer readable medium of claim 9, wherein the first environmental condition is determined in response to a change in the one or more of the first environment conditions exceeding a predetermined threshold.

16. The non-transitory computer readable medium of claim 9, wherein the first environmental condition is determined when incremental snapshot data is replicated among the sites.

17. A system comprising:

a data replication environment having primary and secondary sites;

a replication manager executing on a processor of one or more of the sites, the replication manager including instructions configured to, determine one or more first environmental conditions and administrative constraints of a data replication environment having primary and secondary sites;

select a first figure of merit for determining a first reference snapshot resolution algorithm according to the determined first environmental condition and administrative constraint to reduce resource utilization in the data replication environment;

calculate the first figure of merit from the determined first reference snapshot resolution algorithm;

resolve a first reference snapshot based on the calculated figure of merit; and perform incremental snapshot replication of data between the primary and secondary sites using the first reference snapshot.

18. The system of claim 17, wherein the replication manager executing on the processor of the one or more of the sites further include instructions configured to:

determine one or more second environmental conditions and administrative constraints of the data replication environment;

select a second figure of merit for determining a second reference snapshot resolution algorithm according to the determined second environmental condition and administrative constraint;

resolve second reference snapshot based on the determined second reference snapshot resolution algorithm; and perform incremental snapshot replication of data between the primary and secondary sites using the second reference snapshot.

19. The system of claim 17, wherein the first figure of merit is selected from a group consisting of time-distance d and path-distance.

20. The system of claim 17, wherein the administrative constraint is a recovery point objective.

21. The system of claim 17, wherein the first snapshot resolution algorithm is determined based on a system constraint according to a type of storage device at one or more of the sites.

22. The system of claim 17, wherein the first environmental condition is determined periodically.

23. The system of claim 17, wherein the first environmental condition is determined in response to a change in the one or more of the first environment conditions exceeding a predetermined threshold.

24. The system of claim 17, wherein the first environmental condition is determined when incremental snapshot data is replicated among the sites.

* * * * *